Figure 1:
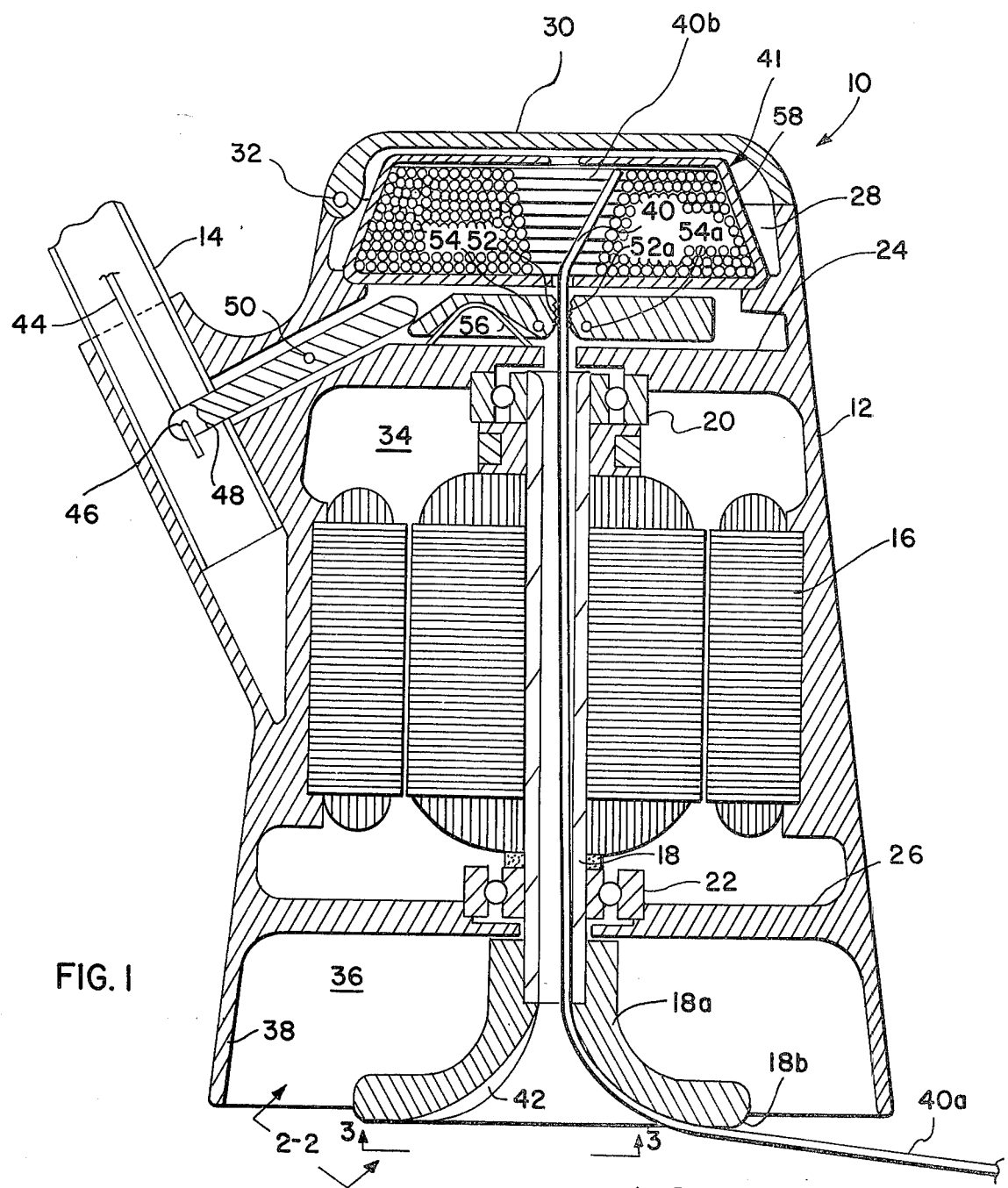

United States Patent [19]
Pittinger, Jr.

[11] 3,928,911
[45] Dec. 30, 1975

[54] HOLLOW-SHAFT FEED FILAMENT TRIMMER
[76] Inventor: Charles B. Pittinger, Jr., 79 Maybin Circle, Owings Mills, Md. 21117
[22] Filed: Oct. 15, 1974
[21] Appl. No.: 514,561

[52] U.S. Cl. ................................ 30/276; 56/12.7
[51] Int. Cl.² .................................... B26B 27/00
[58] Field of Search ........ 30/276, 347; 56/12.7, 295

[56] References Cited
UNITED STATES PATENTS

| 3,664,102 | 5/1972 | Reber | 56/295 |
| 3,693,255 | 9/1972 | Langenstein | 30/276 |
| 3,826,068 | 7/1974 | Ballas | 56/12.7 |

Primary Examiner—Harold D. Whitehead
Assistant Examiner—J. C. Peters
Attorney, Agent, or Firm—John F. McClellan, Sr.

[57] ABSTRACT

A filament trimmer mechanism including a rotary power-drive having a hollow output shaft with a bellmouth at one end, a filament storage at the other end of the hollow shaft, and filament secured to the hollow shaft and passing through and extending beyond the hollow shaft and bellmouth as a cutting length, the bellmouth having at least one radial groove dimensioned for engaging the filament and swinging the cutting length radially on rotation of the hollow shaft and bellmouth.

9 Claims, 3 Drawing Figures

HOLLOW-SHAFT FEED FILAMENT TRIMMER

Cross reference is made to my co-pending application for United States Patent filed concurrently herewith and entitled "Disk For Filament Trimmer" Ser. No. 514,560, filed Oct. 15, 1974, notice of allowance having been received on same.

This invention relates generally to vegetation trimmers and the like and specifically to filament-type trimmers.

In the operation of filament trimmers the filament must be replaced when worn or broken off. My above cross-referenced Application discloses an automatic fixed-length replacement means having an array of lengths of filament stored in criss-cross fashion as a continuous length strung between and separable by abrasive holes judiciously positioned in a disk, the free end of the filament adapted to be rotated by a power drive as a filament cutter.

A principal object of the present invention is to provide an alternate means for replenishing filament in a filament cutter mechanism, and for driving a free end of the filament as a filament cutter by a novel automatic pickup which prevents fouling and cannot be mis-threaded.

Other objects of the present invention are to provide a device as described which drives any customary weight filament, without adjustment, which tends to release automatically when overloaded, which never requires handling of the cutting end, which resists damage from dust, dirt and debris, and which reliably cuts to the same height when fresh filament is fed to replace worn filament.

And a further object is to provide a device as described in which the filament supply is easily and safely removable and replaceable with a different filament, such as when trimming different vegetation.

Yet further objects are to provide a device as described which operates uniformly regardless of direction of rotation, which safely prevents unwanted chafing of filaments by the device during normal operation, which is lightweight, of low inertia, economical, and attractive in appearance.

Figure 2:
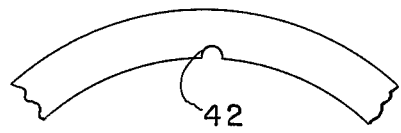
Figure 3:
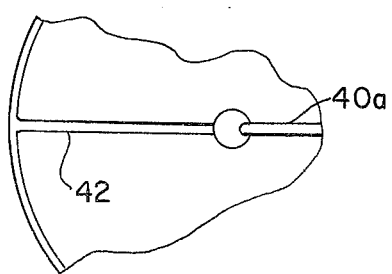

The above and other objects and advantages of this invention will become more readily apparent on examination of the following description of which the drawings form a part, and refer to like parts by like reference numerals. In the drawings:

FIG. 1 is a side elevation in section;
FIG. 2 is a detail taken at 2—2, FIG. 1; and
FIG. 3 is a bottom plan detail taken at 3—3, FIG. 1.

Referring now to the drawings in detail:

FIG. 1 shows the invention 10 as generally including a housing 12 having a handle 14 for manual manipulation, a motor 16 conventionally mounted within the housing and having an armature-driven output shaft 18 conventially carried on upper and lower bearings 20 and 22. Partitions 24, 26 mount the respective bearings and divides the housing interiorly into three chambers.

The upper chamber 28 has a top 30 which is openable, as by a hinge 32.

The center chamber 34 contains the motor.

The lower chamber 36 is in the form of a downward skirt 38 open at the bottom.

The output shaft 18 is a cylindrical tube and connects the upper chamber with a bellmouth structure 18a coaxially affixed at the lower end of the output shaft, substantially within the lower chamber but extending slightly below it at the belled end 18b.

A filament 40 extends down the hollow output shaft from a supply 41 in the first chamber and the free end passes through and beyond the bellmouth any distance chosen by the user as a filament cutting length 40a.

The bellmouth is a 360° opening but has one or more radial grooves 42 therein which, on operation of the mechanism, capture the filament free-end and swing the cutting length in a plane centered on the axis of rotation.

Feeding fresh filament is accomplished by pulling release rod 44, which represents the control and is on the handle. The upper end of the release rod may be curved to form a trigger, or a conventional pistol grip and pivoted trigger may be supplied. The release rod engages hole 46 in release cam 48 and pivots the release cam about pin 50, in turn pivoting toothed jaw 52 of the pinch type filament lock about pin 54, against the action of locking spring 56.

Toothed jaw 52a pivots about pin 54a in response to gravity and to pressure from the filament under urging by the other jaw which releases and applies pressure to the filament by camming of the toothed part toward and away from the filament.

Centrifugal force of the filament first end or free end pulls the filament down from coil 40b stored in replaceable hollow perforate spool 58 held in the upper compartment, until the filament lock is engaged to prevent the second or stored end of the filament from further feeding.

The hollow shaft and the bellmouth and groove structure are smooth, and the monofilament is substantially stiff in conventionally used diameters. This together with the centrifugal action causes the filament to spin freely, evening wear on the cutting length and preventing twisting up in the hollow shaft even though the storage portion does not rotate.

FIG. 2 and FIG. 3 further detail the relation of the filament and groove structure. It can be seen that various sizes of filament can be accommodated, and further that should a heavy filament hang on an obstacle, rotation of the bellmouth would tend safely to free the filament from the groove by tipping the entire mechanism, including the housing. If the hangup continued, continued rotation of the bellmouth would tend eventually to chafe the filament in two, preventing further hazard. It would then be necessary only to feed further filament down from the supply, in the normal manner employed to obtain a fresh length to replace a worn filament.

The rounded circular edge of the bellmouth safely prevents jamming or abrading in ordinary usage, while being at all times ready for instant pickup of the cutting length of filament when the device is turned on.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. In a filament trimmer having aframe mounting a rotary drive means, a filament having first and second ends, and means connecting the filament with the rotary drive means, the improvement comprising: the rotary drive means having a hollow output shaft with first and second ends and with an open bellmouth at said first end, the filament disposed in the hollow output shaft and having the first end freely protrusive from the bellmouth, and means for securing the second end of the filament and swinging said first end thereof as a filament trimmer on rotation of the rotary drive means.

2. In a filament trimmer as recited in claim 1, the means for engaging the filament comprising structure defining at least one recess at the bellmouth.

3. In a filament trimmer as recited in claim 2, said at least one recess being a groove oriented radially outward in the bellmouth, the edge of said bellmouth being circular and rounded.

4. In a filament trimmer as recited in claim 2, said at least one recess being a groove oriented radially outward in the bellmouth, and the means for securing the second end of the filament being affixed to said frame.

5. In a filament trimmer as recited in claim 4, additionally, means on said filament trimmer for storing a supply of filament proximate said second end of the hollow output shaft.

6. In a filament trimmer as recited in claim 5, said means for storing a supply of filament including a hollow spool holding a portion of the filament therein.

7. In a filament trimmer as recited in claim 5, additionally, means for feeding filament through the hollow output shaft and bellmouth.

8. In a filament trimmer as recited in claim 7, said means for feeding filament through the hollow output shaft and bellmouth including a control on the handle of said filament trimmer.

9. In a filament trimmer as recited in claim 8, said means for feeding filament through the hollow output shaft and bellmouth including a pinch type filament lock releasable in response to actuation of said control.

* * * * *

UNITED STATES PATENT OFFICE
CERTIFICATE OF CORRECTION

Patent No. 3,928,911               Dated   December 30, 1975

Inventor(s)  Charles B. Pittinger, Jr.

It is certified that error appears in the above-identified patent and that said Letters Patent are hereby corrected as shown below:

Claim 2, line 1, cancel "the".

Signed and Sealed this thirtieth Day of August 1977

[SEAL]

Attest:

RUTH C. MASON
*Attesting Officer*

C. MARSHALL DANN
*Commissioner of Patents and Trademarks*